US008136595B2

(12) United States Patent
Weaver et al.

(10) Patent No.: US 8,136,595 B2
(45) Date of Patent: Mar. 20, 2012

(54) METHODS FOR CONTROLLING PARTICULATE FLOWBACK AND MIGRATION IN A SUBTERRANEAN FORMATION

(75) Inventors: Jimmie D. Weaver, Duncan, OK (US); Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/634,469

(22) Filed: Dec. 9, 2009

(65) Prior Publication Data

US 2011/0030950 A1 Feb. 10, 2011

Related U.S. Application Data

(63) Continuation-in-part of application No. 12/537,860, filed on Aug. 7, 2009.

(51) Int. Cl.
*E21B 33/13* (2006.01)
(52) U.S. Cl. ............... 166/295; 166/305.1; 166/281
(58) Field of Classification Search .................. None
See application file for complete search history.

(56) References Cited

U.S. PATENT DOCUMENTS

| | | | |
|---|---|---|---|
| 4,585,064 A | 4/1986 | Graham et al. | |
| 4,670,501 A | 6/1987 | Dymond et al. | |
| 5,249,627 A | 10/1993 | Harms et al. | |
| 5,420,174 A | 5/1995 | Dewprashad | |
| 5,833,000 A | 11/1998 | Weaver et al. | |
| 5,839,510 A | 11/1998 | Weaver et al. | |
| 5,853,048 A | 12/1998 | Weaver et al. | |
| 6,047,772 A | 4/2000 | Weaver et al. | |
| 6,311,773 B1 | 11/2001 | Todd et al. | |
| 6,439,309 B1 | 8/2002 | Matherly et al. | |
| 6,488,091 B1 | 12/2002 | Weaver et al. | |
| 6,582,819 B2 | 6/2003 | McDaniel et al. | |
| 6,677,426 B2 | 1/2004 | Noro et al. | |
| 6,866,099 B2 * | 3/2005 | Nguyen | 166/308.1 |
| 6,892,813 B2 | 5/2005 | Nguyen et al. | |
| 7,131,491 B2 | 11/2006 | Blauch et al. | |
| 7,153,575 B2 | 12/2006 | Anderson et al. | |
| 7,237,609 B2 * | 7/2007 | Nguyen | 166/280.2 |
| 7,819,192 B2 | 10/2010 | Weaver et al. | |
| 2005/0277554 A1 | 12/2005 | Blauch et al. | |
| 2007/0289781 A1 | 12/2007 | Rickman et al. | |
| 2008/0011478 A1 | 1/2008 | Welton et al. | |
| 2011/0030949 A1 | 2/2011 | Weaver | |

FOREIGN PATENT DOCUMENTS

EP 1403466 A2 * 7/2003

OTHER PUBLICATIONS

SandWedge® NT Conductivity Enhancement System, 2005.
SilverStimSM LT Fracturing Service, 2007.
Office Action for U.S. Appl. No. 12/537,860 dated Dec. 29, 2010.
Office Action for U.S. Appl. No. 12/537,860 dated Feb. 8, 2011.
Office Action for U.S. Appl. No. 12/537,860 dated Aug. 12, 2011.

* cited by examiner

*Primary Examiner* — Angela M DiTrani
(74) *Attorney, Agent, or Firm* — Robert A. Kent; McDermott Will & Emery LLP

(57) ABSTRACT

Methods useful in treating subterranean formations to control particulate migration with a tacky-consolidate treatment fluid comprising a resin and a tackifying compound. One method comprises the steps of providing a portion of a subterranean formation comprising unconsolidated particulates; providing a tacky-consolidate treatment fluid comprising a tackifying compound, a curable resin, and a silane coupling agent; and placing the tacky-consolidate treatment fluid in the subterranean formation so as to form a tacky consolidate that comprises at least a portion of the unconsolidated particulates.

17 Claims, No Drawings

METHODS FOR CONTROLLING
PARTICULATE FLOWBACK AND
MIGRATION IN A SUBTERRANEAN
FORMATION

This application is a continuation in part of U.S. patent application Ser. No. 12/537,860, filed Aug. 7, 2009, which is hereby incorporated by reference in its entirety herein.

BACKGROUND

The present invention relates to methods useful in treating subterranean formations. More particularly, the present invention relates to methods of controlling particulate migration from a subterranean formation with a tacky consolidate treatment fluid comprising a resin and a tackifying compound.

Often subterranean formations are subjected to treatments that insert particulates at or near a production zone. One such treatment is hydraulic fracturing. In hydraulic fracturing treatments, a viscous fracturing fluid, which also functions as a carrier fluid, is pumped into a producing zone to be fractured at a rate and pressure such that one or more fractures are formed in the zone. Particulate solids commonly referred to in the art as "proppant," are commonly suspended in a portion of the fracturing fluid so that the proppant is deposited in the fractures. The proppant deposited in the fractures functions to prevent the fractures from fully closing so that conductive channels are formed through which produced hydrocarbons may flow. Generally, the force of the formation bearing down on the proppant acts to keep the proppant in place. However, it is often the case that not all of the proppant will be effectively trapped by the pressure of the formation. For instance, some proppant particulates may break free of the proppant pack with the force of the produced fluids, or some portion of the proppant particulates may crush under the pressure of the formation and create unconsolidated particulates.

Gravel packs may also act to add particulates into a portion of a subterranean formation. A "gravel pack" is a term commonly used to refer to a volume of particulate materials (such as sand) placed into a well bore to at least partially reduce the migration of unconsolidated formation particulates into the well bore. Gravel packing operations commonly involve placing a gravel pack screen in the well bore neighboring a desired portion of the subterranean formation, and packing the surrounding annulus between the screen and the subterranean formation with particulate materials that are sized to prevent and inhibit the passage of formation solids through the gravel pack with produced fluids. In some instances, a screenless gravel packing operation may be performed. In either case, the resulting structure presents a barrier to migrating formation particles, and stabilizes the formation, while still permitting fluid flow. The gravel, among other things, is designed to prevent the particulates from occluding the screen or migrating with the produced fluids, and the screen acts to prevent the gravel from entering the well bore. However, it is possible for gravel to escape from the confines of the pack or for the gravel pack to bridge or otherwise fail to fully halt the flow of unconsolidated particulates into the well bore.

In some situations, hydraulic fracturing and gravel packing operations may be combined into a single treatment. Such treatments are often referred to as "frac pack" operations. In some cases, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Fracturing, gravel packing, and frac-packing treatments are referred to herein collectively as "completion operation(s)."

Particulates (such as proppant or gravel) used in subterranean operations are often coated with resins to facilitate consolidation of the particulates and/or to prevent their subsequent flow-back through the conductive channels in the subterranean formation, which can, for example, clog the conductive channels and/or damage the interior of the formation or equipment. As used herein, the term "coated" does not imply any particular degree of coverage of the particulates. Resins may also be placed downhole to consolidate particulates located therein. The term "resin" as used herein refers to any of numerous physically similar polymerized synthetics or chemically modified natural resins including thermoplastic materials and thermosetting materials.

In addition to maintaining a relatively solids-free production stream, consolidating particulates also aids in protecting the conductivity of the formation and preventing further particulate migration. Flow of unconsolidated particulate material through the conductive channels in a subterranean formation may tend to clog the conductive channels and/or damage the interior of the well bore or may erode downhole equipment, plug piping and vessels, and cause damage to valves, instruments and other production equipment. These unconsolidated particulates may reside in a portion of the subterranean formation that is located in the near well bore region, neighboring a fracture face, or within a fracture in the subterranean formation.

SUMMARY

The present invention relates to methods useful in treating subterranean formations. More particularly, the present invention relates to methods of controlling particulate migration from a subterranean formation with a tacky consolidate treatment fluid comprising a resin, a tackifying compound, and a silane coupling agent.

In one embodiment, the present invention provides a method comprising: providing a portion of a subterranean formation comprising unconsolidated particulates; providing a tacky-consolidate treatment fluid comprising a tackifying compound, a curable resin, and a silane coupling agent; and placing the tacky-consolidate treatment fluid in the subterranean formation so as to form a tacky consolidate that comprises at least a portion of the unconsolidated particulates.

In one embodiment, the present invention provides a method comprising: providing a well bore in a subterranean formation in which a well treatment has been performed, a portion of the well bore comprising particulates; providing a tacky-consolidate treatment fluid comprising a tackifying compound, a curable resin, and a silane coupling agent; and placing the tacky-consolidate treatment fluid in the subterranean formation so as to form a tacky consolidate that consolidates at least a portion of the particulates. The well treatment that is performed in the well bore may comprise a completion operation or an acidizing treatment.

In one embodiment, the present invention provides a method comprising: providing a portion of a subterranean formation comprising unconsolidated particulates; providing a tacky-consolidate treatment fluid comprising a tackifying compound, a curable resin, and a silane coupling agent; placing the tacky-consolidate treatment fluid in the subterranean formation so as to form a tacky consolidate that consolidates at least a portion of the unconsolidated particulates; and performing a completion treatment in the subterranean formation.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods useful in treating subterranean formations. More particularly, the present invention relates to methods of controlling particulate migration from a subterranean formation with both a resin and a tackifying compound. The methods and compositions of the present invention are applicable to many subterranean uses including, but not limited to, production and injection wells. The methods and compositions apply to both matrix and fracture treatments as well as remedial treatments.

One of the many potential advantages of the methods of the present invention is that they allow for the use of only a small amount of curable resin in the preparation of coated particulates, thereby lowering costs and minimizing the amount of resin that may stick to and coat equipment used in preparing the coated particulates. Another potential advantage of the methods of the present invention is assistance in the prevention of the migration and invasion of formation fines into or through proppant packs. Another potential advantage of the methods of the present invention is in allowing for a single treatment to minimize the migration of fines within the treated portion of the formation while also providing cohesive strength and minimizing proppant flowback during production through a portion of a subterranean formation that has been treated according to the methods of the present invention. Still another potential advantage is that the cohesion strength of the resultant proppant pack may be tailored to a specific application so as to focus on reducing proppant flowback, minimizing fines migration, or both.

Additionally, using a combination of a resin and a tackifying compound in a tacky-consolidate treatment fluids of the present invention creates a synergistic effect because the tackifying compound may act as a curing agent for the resin. When the resin cures to form a tacky consolidate, the consolidate still has tackiness from the tackifying compound, which is useful to control particulate migration. The term "tacky consolidate" as used herein refers to the consolidation of particulates by the resin as that is generally understood into a consolidated mass, but unlike other consolidated masses of particulates, these formed in conjunction with the compositions and methods of the present invention, retain tackiness due to the presence of the tackifying compound.

In some embodiments, the present invention provides methods that include a method that comprises: providing a portion of a subterranean formation comprising particulates that may include proppant, gravel, or formation fines; providing an tacky-consolidate treatment fluid comprising a tackifying compound, a curable resin, and a silane coupling agent; and placing the tacky-consolidate treatment fluid in the subterranean formation so as to form a tacky consolidate that consolidates at least a portion of the particulates.

The tacky-consolidate treatment fluids of the present invention comprise an emulsion that comprises a discontinuous phase and a continuous phase. The tacky-consolidate treatment fluids of the present invention comprise a resin and a tackifying compound. The resin comprises a portion of the discontinuous phase, and the tackifying compound comprises another portion of the discontinuous phase. The continuous phase comprises an aqueous-based fluid that comprises a silane-coupling agent. Optionally, other components may be included in these fluids, if desired. For instance, wetting agents (e.g., to enhance coating of the particulates), scale inhibitors, corrosion inhibitors, and the like. The emulsion in the tacky-consolidate treatment fluids, preferably, remains stable until placement of the resin and tackifying compound downhole. In forming the tacky-consolidate treatment fluid, in some embodiments, an emulsion comprising the resin and a separate emulsion comprising the tackifying compound may be combined (e.g., on-the-fly, or pre-mixed before the job). In certain embodiments, the resin may comprise from about 0.1% to about 10% (w/w) of the tacky-consolidate treatment fluid. The tackifying compound may comprise from about 0.1% to about 10% (w/w) of the tacky-consolidate treatment fluid. The silane coupling agent may comprise from about 0.01% to about 2% (w/w) of the tacky-consolidate treatment fluid. Preferably, the tackifying compound is present in about 1% to about 5% (w/w), the resin is present in an amount of about 0.1% to about 2% (w/w), and the silane coupling agent is present in an amount of abut 0.05% to 0.2% (w/w) of a silane coupling agent. In a preferred embodiment, the resin is an epoxy resin.

The continuous phase may be any aqueous fluid that does not cause the emulsion to break. Suitable aqueous fluids include, but are not limited to, water, brines, saltwater, seawater, and the like. In some embodiments, alcohols or glycol ethers may be used, provided they do not interfere with the stability of the emulsion. The aqueous fluid comprises the balance of the volume of the fluid when considering the amount of resin, tackifying compound, silane coupling agent, and other additives that are present in the fluid.

I. Suitable Resins

Nearly all resins known in the art that are suitable for use in subterranean operations may be used in the methods of the present invention. The term "resin" as used herein refers to any of numerous physically similar polymerized synthetics or chemically modified natural resins including thermoplastic materials and thermosetting materials.

Resins suitable for use in the present invention include all resins known in the art that are capable of forming a hardened, consolidated mass. Many such resins are commonly used in subterranean operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, water-based resins, HT epoxy-based resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

In some embodiments, the resin may be provided as an emulsion. Suitable emulsion resins include, but are not limited to, emulsified epoxide resins. In embodiments where the resin is provided as an emulsion, the emulsion may have an aqueous external phase and an internal resin phase. Examples of suitable resin emulsion compositions are described in U.S. Pat. No. 7,819,192 and U.S. Published Application Nos. 2007 0187097 and 2007-0289781, which are incorporated by reference in their entirety.

A. Two-Component Epoxy Based Resins

One resin-type coating material suitable for use in the methods of the present invention is a two-component epoxy based resin comprising a hardenable resin component and a hardening agent component. The hardenable resin component is comprised of a hardenable resin and an optional solvent. The solvent may be added to the resin to reduce its viscosity for ease of handling, mixing and transferring. It is within the ability of one skilled in the art with the benefit of this disclosure to determine if and how much solvent may be needed to achieve a viscosity suitable to the subterranean conditions. Factors that may affect this decision include geographic location of the well and the surrounding weather conditions. An alternate way to reduce the viscosity of the hardenable resin is to heat it. This method avoids the use of a solvent altogether, which may be desirable in certain circumstances. The second component is the hardening agent component, which is comprised of a hardening agent, a organosilane coupling agent, a surfactant, an optional hydrolyzable ester for, among other things, breaking gelled fracturing fluid films on the proppant particles, and an optional carrier fluid for, among other things, reducing the viscosity of the hardening agent component. It is within the ability of one skilled in the art with the benefit of this disclosure to determine if and how much carrier fluid is needed to achieve a viscosity suitable to the subterranean conditions.

Examples of hardenable resins that can be used in the hardenable resin component include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resin, urea-aldehyde resins, furan resins, urethane resins, a glycidyl ether resins, other epoxide resins, and combinations thereof. In some embodiments, the hardenable resin may comprise a urethane resin. Examples of suitable urethane resins may comprise a polyisocyanate component and a polyhydroxy component. Examples of suitable hardenable resins that may be suitable for use in the methods of the present invention include those described in U.S. Pat. No. 6,582,819 issued to McDaniel, et al., U.S. Pat. No. 4,585,064 issued to Graham, et al., U.S. Pat. No. 6,677,426 issued to Noro, et al., and U.S. Pat. No. 7,153,575 issued to Anderson, et al., each of which are incorporated by reference herein in their entirety. The hardenable resin used is included in the hardenable resin component in an amount in the range of from about 60% to about 100% by weight of the hardenable resin component. In some embodiments the hardenable resin used is included in the hardenable resin component in an amount of about 70% to about 90% by weight of the hardenable resin component. It is within the ability of one skilled in the art with the benefit of this disclosure to determine how much of the hardenable resin component may be need to achieve the desired results. Factors that may affect this decision include which type of hardenable resin component and hardening agent component are used.

Any solvent that is compatible with the hardenable resin and achieves the desired viscosity effect is suitable for use in the hardenable resin. Some preferred solvents are those having high flash points (e.g., about 125° F.) because of among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other preferred solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin composition chosen and is within the ability of one skilled in the art with the benefit of this disclosure.

As described above, use of a solvent in the hardenable resin component is optional but may be desirable to reduce the viscosity of the hardenable resin component for ease of handling, mixing, and transferring. It is within the ability of one skilled in the art, with the benefit of this disclosure, to determine if and how much solvent is needed to achieve a suitable viscosity. In some embodiments the amount of the solvent used in the hardenable resin component is in the range of from about 0.1% to about 30% by weight of the hardenable resin component. Optionally, the hardenable resin component may be heated to reduce its viscosity, in place of, or in addition to, using a solvent.

Examples of the hardening agents that can be used in the hardening agent component include, but are not limited to, cyclo-aliphatic amines, piperazine, derivatives of piperazine (e.g., aminoethylpiperazine), modified piperzines, aromatic amines, methylene dianiline, derivatives of methylene dianiline, hydrogenated forms of dianiline, 4,4'-diaminodiphenyl sulfone, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, ethylene diamine, diethylene triamine, triethylene tetraamine, tetraethylene pentaamine, cyclo-aliphatic amines, amides, polyamides, 2-ethyl-4-methyl imidazole, 1,1,3-trichlorotrifluoroacetone, and combinations thereof. The chosen hardening agent often effects the range of temperatures over which a hardenable resin is able to cure. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris(dimethylaminomethyl) phenol, and 2-(N$_2$N-dimethylaminomethyl)phenol are preferred with N,N-dimethylaminopyridine most preferred. In subterranean formations having higher temperatures, 4,4'-diaminodiphenyl sulfone may be a suitable hardening agent. Hardening agents that comprise piperazine or a derivative of piperazine have been shown capable of curing various hardenable resins from temperatures as low as about 70° F. to as high as about 350° F.

The hardening agent may be included in the hardening agent component in an amount sufficient to at least partially resin. In some embodiments of the present invention, the hardening agent used is included in the hardenable resin component in the range of from about 0.1% to about 95% by weight of the hardening agent component. In some embodiments the hardenable resin used is included in the hardenable resin component in an amount of about 15% to about 85% by weight of the hardening agent component. In some embodiments the hardenable resin used is included in the hardenable resin component in an amount of about 15% to about 55% by weight of the hardening agent component.

Any organosilane coupling agent that is compatible with the hardenable resin and facilitates the coupling of the resin to the surface of the particulates is suitable for use in the present invention. Examples of organosilane coupling agents include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes, aminoethyl-N-beta-(aminoethyl)-gamma-aminopropyl-trimethoxysilanes; gamma-ureidopropyl-triethoxysilanes; beta-(3-4 epoxy-cyclohexyl)-ethyl-trimethoxysilane; and gamma-glycidoxypropyltrimethoxysilanes; vinyltrichlorosilane; vinyltris(beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-β(aminoethyl)-r-aminopropyl-trimethoxysilane; N-beta (aminoethyl)-r-aminopropylmethyldimethoxysilane; 3-aminopropyl-triethoxysilane; N-phenyl-r-aminopropyltrimethoxysilane; r-mercaptopropyltrimethoxysilane; Vinyltrichlorosilane; vinyltris(β-methoxyethoxy) silane; Vinyltrimethoxysilane; r-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta (aminoethyl)-r-aminopropyltrimethoxysilane; N-beta (aminoethyl)-r-aminopropylmethyldimethoxysilane; r-aminopropyltriethoxysilane; N-phenyl-r-aminopropyltrimethoxysilane; r-mercaptopropyltrimethoxysilane; and combinations thereof. The organosilane coupling agent used is included in the hardening agent component in an amount capable of sufficiently bonding the resin to the particulate. In some embodiments of the present invention, the organosilane coupling agent used is included in the hardenable resin component in the range of from about 0.1% to about 3% by weight of the hardening agent component.

Any surfactant compatible with the hardening agent and capable of facilitating the coating of the resin onto particles in the subterranean formation may be used in the hardening agent component. Such surfactants include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, and one or more nonionic surfactants. Mixtures of one or more cationic and nonionic surfactants also may be suitable. Examples of such surfactant mixtures are described in U.S. Pat. No. 6,311,773 issued to Todd et al. on Nov. 6, 2001, the relevant disclosure of which is incorporated herein by reference. The surfactant or surfactants used are included in the hardening agent component in an amount in the range of from about 1% to about 10% by weight of the hardening agent component.

While not required, examples of hydrolysable esters that can be used in the hardening agent component of the integrated consolidation fluids of the present invention include, but are not limited to, a mixture of dimethylglutarate, dimethyladipate, and dimethylsuccinate; sorbitol; catechol; dimethylthiolate; methyl salicylate; dimethyl salicylate; dimethylsuccinate; tert-butylhydroperoxide; and combinations thereof. When used, a hydrolyzable ester is included in the hardening agent component in an amount in the range of from about 0.1% to about 3% by weight of the hardening agent component. In some embodiments a hydrolysable ester is included in the hardening agent component in an amount in the range of from about 1% to about 2.5% by weight of the hardening agent component.

Use of a diluent or carrier fluid in the hardenable resin composition is optional and may be used to reduce the viscosity of the hardenable resin component for ease of handling, mixing and transferring. It is within the ability of one skilled in the art, with the benefit of this disclosure, to determine if and how much carrier fluid is needed to achieve a viscosity suitable to the subterranean conditions. Any suitable carrier fluid that is compatible with the hardenable resin and achieves the desired viscosity effects is suitable for use in the present invention. Some preferred carrier fluids are those having high flash points (e.g., about 125° F.) because of, among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, butyl alcohol, d'limonene, fatty acid methyl esters, and combinations thereof. Other preferred carrier fluids include aqueous dissolvable solvents such as, methanol, isopropanol, butanol, glycol ether solvents, and combinations thereof. Suitable glycol ether carrier fluids include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate carrier fluid is dependent on the resin composition chosen and is within the ability of one skilled in the art with the benefit of this disclosure.

B. Furan Resins

Other resins suitable for use in the methods of the present invention are furan-based resins. Suitable furan-based resins include, but are not limited to, furfuryl alcohol resins, mixtures furfuryl alcohol resins and aldehydes, and a mixture of furan resins and phenolic resins. Of these, furfuryl alcohol resins are preferred. A furan-based resin may be combined with a solvent to control viscosity if desired. Suitable solvents for use in the furan-based consolidation fluids of the present invention include, but are not limited to isopropyl alcohol, 2-butoxy ethanol, butyl lactate, butyl acetate, tetrahydrofurfuryl methacrylate, tetrahydrofurfuryl acrylate, esters of oxalic, maleic and succinic acids, and furfuryl acetate. Of these, 2-butoxy ethanol is preferred.

Optionally, the furan-based resins suitable for use in the present invention may further comprise a curing agent to, among other things, facilitate or accelerate curing of the furan-based resin at lower temperatures. The presence of a curing agent may be particularly useful in embodiments where the furan-based resin may be placed within subterranean formations having temperatures below about 350° F. Examples of suitable curing agents include, but are not limited to, organic or inorganic acids, such as maleic acid, fumaric acid, sodium bisulfate, hydrochloric acid, hydrofluoric acid, acetic acid, formic acid, phosphoric acid, sulfonic acid, alkyl benzene sulfonic acids such as toluene sulfonic acid and dodecyl benzene sulfonic acid ("DDBSA"), and combinations thereof. In those embodiments where a curing agent is not used, the furan-based resin may cure autocatalytically.

C. Phenolic Resins

Still another resin suitable for use in the methods of the present invention is a phenolic-based resin. Suitable phenolic-based resins include, but are not limited to, terpolymers of phenol, phenolic formaldehyde resins, and a mixture of phenolic and furan resins. Of these, a mixture of phenolic and furan resins may be preferred. A phenolic-based resin may be combined with a solvent to control viscosity if desired. Suitable solvents for use in the phenolic-based consolidation fluids of the present invention include, but are not limited to butyl acetate, butyl lactate, furfuryl acetate, and 2-butoxy ethanol. Of these, 2-butoxy ethanol may be preferred.

D. High-Temperature Epoxy Resins

Another resin suitable for use in the methods of the present invention is a high temperature (HT) epoxy-based resin. Suitable HT epoxy-based components include, but are not limited to, bisphenol A-epichlorohydrin resins, polyepoxide resins, novolak resins, polyester resins, glycidyl ethers and mixtures thereof. Of these, bisphenol A-epichlorohydrin resins are preferred. An HT epoxy-based resin may be combined with a solvent to control viscosity if desired. Suitable solvents for use with the HT epoxy-based resins of the present invention are those solvents capable of substantially dissolving the HT epoxy-resin chosen for use in the consolidation fluid. Such solvents include, but are not limited to, dimethyl sulfoxide and dimethyl formamide. A co-solvent such as a dipropylene glycol methyl ether, dipropylene glycol dimethyl ether, dimethyl formamide, diethylene glycol methyl ether, ethylene glycol butyl ether, diethylene glycol butyl ether, propylene carbonate, d'limonene and fatty acid methyl esters, may also be used in combination with the solvent.

E. Phenol/Phenol Formaldehyde/Furfuryl Alcohol Resins

Yet another resin-type coating material suitable for use in the methods of the present invention is a phenol/phenol formaldehyde/furfuryl alcohol resin comprising from about 5% to about 30% phenol, from about 40% to about 70% phenol formaldehyde, from about 10 to about 40% furfuryl alcohol, from about 0.1% to about 3% of a silane coupling agent, and from about 1% to about 15% of a surfactant. In the phenol/phenol formaldehyde/furfuryl alcohol resins suitable for use in the methods of the present invention, suitable organosilane coupling agents and surfactants include those listed above as suitable for use with two-component epoxy based resins.

II. Tackifying Compounds

Tackifying compounds suitable for use in the present invention include non-aqueous tackifying agents; aqueous tackifying agents; and silyl-modified polyamides. In addition to encouraging the proppant particulates to form aggregates, the use of a tackifying agent may yield a propped fracture that experiences very little or no undesirable proppant flow back. Additionally, the use of a tackifying compound may allow for the use of only a small amount of resin in the preparation of coated particulates, thereby minimizing the amount of resin sticking to and coating equipment used in preparing the coated particulates.

A person of ordinary skill in the art, with the benefit of this disclosure, would be able to determine an appropriate combination of tackifying compound and resin to be used together. When selecting a tackifying compound and a resin, care must be taken to ensure that both components have a matching functionality. For example, in certain embodiments of the present invention, when the selected resin comprises two component epoxy based resin a tackifying compound comprising an epoxy functionality may be desirable; such a combination can allow the tackifying compound to act as an activator or curing agent for the curable epoxy resin. A person of ordinary skill in the art, with the benefit of this disclosure, would be able to determinate an appropriate combination of tackifying compound and resin based on the functionality of those components.

A. Non-Aqueous Tackifying Agents

One type of tackifying agent suitable for use in the present invention is a non-aqueous tackifying agent. A particularly preferred group of tackifying agents comprises polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as non-aqueous tackifying compounds include liquids and solutions of, for example, polyesters, polycarbonates and polycarbamates, natural resins such as shellac, and the like. In some preferred embodiments, the non-aqueous tackifying agent is a dimer acid polyamide with additional amine functionality. Other suitable non-aqueous tackifying agents are described in U.S. Pat. No. 5,853,048 issued to Weaver, et al. and U.S. Pat. No. 5,833,000 issued to Weaver, et al., the relevant disclosures of which are herein incorporated by reference.

Non-aqueous tackifying agents suitable for use in the present invention may be either used such that they form non-hardening coating or they may be combined with a multifunctional material capable of reacting with the non-aqueous tackifying agent to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the non-aqueous tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying compound in an amount of from about 0.01 to about 50 percent by weight of the tackifying compound to effect formation of the reaction product. In some preferable embodiments, the compound is present in an amount of from about 0.5 to about 1 percent by weight of the tackifying compound. Suitable multifunctional materials are described in U.S. Pat. No. 5,839,510 issued to Weaver, et al., the relevant disclosure of which is herein incorporated by reference.

Solvents suitable for use with the non-aqueous tackifying agents of the present invention include any solvent that is compatible with the non-aqueous tackifying agent and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

B. Aqueous Tackifying Agents

Aqueous tackifying agents suitable for use in the present invention are not significantly tacky when placed onto a particulate, but are capable of being "activated" (that is destabilized, coalesced and/or reacted) to transform the compound into a sticky, tackifying compound at a desirable time. Such activation may occur before, during, or after the aqueous tackifying agent is placed in the subterranean formation. In some embodiments, a pretreatment may be first contacted with the surface of a particulate to prepare it to be coated with an aqueous tackifying agent. Suitable aqueous tackifying agents are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water. The aqueous tackifying agent may enhance the grain-to-grain contact between the individual particulates within the formation (be they proppant particulates, formation fines, or other particulates), helping bring about the consolidation of the particulates into a cohesive, flexible, and permeable mass. Solvents suitable for use with the aqueous tackifying agents of the present invention include any solvent that is compatible with the aqueous tackifying agent and achieves the desired viscosity effect. Examples of solvents suitable for use in the present invention include, but are not limited to, fresh water, salt water, brine, and sea water. It is within the ability of one skilled in the art, with the benefit of this disclosure, to determine whether a solvent is needed to achieve a viscosity suitable to the subterranean conditions and, if so, how much.

Suitable aqueous tackifying agents include any polymer that can bind, coagulate, or flocculate a particulate. Also, polymers that function as pressure sensitive adhesives may be suitable. Examples of aqueous tackifying agents suitable for use in the present invention include, but are not limited to: acrylic acid polymers; acrylic acid ester polymers; acrylic acid derivative polymers; acrylic acid homopolymers; acrylic acid ester homopolymers (such as poly(methyl acrylate), poly(butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; and acrylic acid/acrylamido-methyl-propane sulfonate co-polymers, derivatives thereof, and combinations thereof. The term "derivative" as used herein refers to any compound that is made from one of the listed compounds, for example, by replacing one atom in the base compound with another atom or group of atoms. Methods of determining suitable aqueous tackifying agents and additional disclosure on aqueous tackifying agents can be found in Published U.S. Patent Application Number 2005-0277554 and U.S. Pat. No. 7,131,491, the relevant disclosures of which are hereby incorporated by reference.

Some suitable tackifying agents are described in U.S. Pat. No. 5,249,627 by Harms, et al., the relevant disclosure of which is incorporated by reference. Harms discloses aqueous tackifying agents that comprise at least one member selected from the group consisting of benzyl coco di-(hydroxyethyl) quaternary amine, p-T-amyl-phenol condensed with formaldehyde, and a copolymer comprising from about 80% to about 100% $C_{1-30}$ alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. Suitable hydrophilic monomers may be any monomer that will provide polar oxygen-containing or nitrogen-containing groups. Suitable hydrophilic monomers include dialkyl amino alkyl (meth)acrylates and their quaternary addition and acid salts, acrylamide, N-(dialkyl amino alkyl) acrylamide, methacrylamides and their quaternary addition and acid salts, hydroxy alkyl(meth)acrylates, unsaturated carboxylic acids such as methacrylic acid or preferably acrylic acid, hydroxyethyl acrylate, acrylamide, and the like. These copolymers can be made by any suitable emulsion polymerization technique. Methods of producing these copolymers are disclosed, for example, in U.S. Pat. No. 4,670,501, the relevant disclosure of which is incorporated herein by reference.

C. Silyl-Modified Polyamide Compounds

Silyl-modified polyamide compounds suitable for use as an adhesive substance in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is herein incorporated by reference.

Solvents suitable for use with the silyl-modified polyamide compounds of the present invention include any solvent that is compatible with the silyl-modified polyamide compounds and achieves the desired viscosity effect. The solvents that can be used in the present invention preferably include those having high flash points (most preferably above about 125° F.). Examples of solvents suitable for use in the present invention include, but are not limited to, ethers, alcohols, carbonates, acetates, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, and fatty acid methyl esters. It is within the ability of one skilled in the art, with the benefit of this disclosure, to determine whether a solvent is needed to achieve a viscosity suitable to the subterranean conditions and, if so, how much In one embodiment, the present invention provides a method comprising:
providing a portion of a subterranean formation comprising unconsolidated particulates; providing an tacky-consolidate treatment fluid comprising a tackifying compound, a curable resin, and a silane coupling agent; and placing the tacky-consolidate treatment fluid in the subterranean formation so as to form a tacky consolidate that comprises at least a portion of the unconsolidated particulates.

In one embodiment, the present invention provides a method comprising:
providing a well bore in a subterranean formation in which a well treatment has been performed, a portion of the well bore comprising particulates; providing an tacky-consolidate treatment fluid comprising a tackifying compound, a curable resin, and a silane coupling agent; and placing the tacky-consolidate treatment fluid in the subterranean formation so as to form a tacky consolidate that consolidates at least a portion of the particulates. The well treatment that is performed in the well bore may comprise a completion operation or an acidizing treatment.

In one embodiment, the present invention provides a method comprising: providing a portion of a subterranean formation comprising unconsolidated particulates; providing an tacky-consolidate treatment fluid comprising a tackifying compound, a curable resin, and a silane coupling agent; placing the tacky-consolidate treatment fluid in the subterranean formation so as to form a tacky consolidate that consolidates at least a portion of the unconsolidated particulates; and performing a completion treatment in the subterranean formation.

To facilitate a better understanding of the present invention, the following examples of certain aspects of some embodiments are given. In no way should the following examples be read to limit, or define, the scope of the invention. To facilitate a better understanding of the present invention, the following examples of certain aspects of some embodiments are given. In no way should the following examples be read to limit, or define, the entire scope of the invention.

Example 1

Two hundred grams of 20/40-mesh Brady sand were first dry coated with 2 mL of a tackifying compound (a dimer acid polyamide with additional amine functionality). The coated sand was then added to 250 mL of tap water and stirred well with an overhead stirrer to form a slurry. It was observed that the coated sand was quite tacky. A water-based emulsion (water external phase) of modified bisphenol A-Epichlorohydrin based epoxy resin in an amount of 4 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to remain tacky with some consolidation. Consolidated cores were cut into size for unconfined compressive strength measurements. An average UCS of 8 psi was obtained.

Example 2

Two hundred grams of 20/40-mesh Brady sand were first dry coated with 2 mL of a tackifying compound (a dimer acid polyamide with additional amine functionality). The coated sand was then added to 250 mL of tap water and stirred well with an overhead stirrer to form a slurry. It was observed that the coated sand was quite tacky. A water-based emulsion (water external phase) of modified bisphenol A-Epichlorohydrin based epoxy resin in an amount of 8 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to remain tacky with some consolidation. Consolidated cores were cut into size for unconfined compressive strength measurements. An average UCS of 10 psi was obtained.

Example 3

Two hundred grams of 20/40-mesh Brady sand were first dry coated with 2 mL of a tackifying compound (a dimer acid polyamide with additional amine functionality). The coated sand was then added to 250 mL of 30 lbs/Mgal linear borate fracturing fluid (SILVERSTIM$^{SM}$ LT, available from Halliburton Energy Services in Duncan, Okla.) and stirred well with an overhead stirrer to form a slurry. It was observed that the coated sand was quite tacky. A water-based emulsion (water external phase) of modified bisphenol A-Epichlorohydrin based epoxy resin in an amount of 4 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to be tacky and firm, yet bendable (flexible), indicating the pack possessed some consolidation.

Example 4

Two hundred grams of 20/40-mesh Brady sand were first dry coated with 2 mL of a tackifying compound (a dimer acid polyamide with additional amine functionality). The coated sand was then added to 250 mL of 30 lbs/Mgal linear borate fracturing fluid (SILVERSTIM$^{SM}$ LT) and stirred well with an overhead stirrer to form a slurry. It was observed that the coated sand was quite tacky. A water-based emulsion (water external phase) of modified bisphenol A-Epichlorohydrin based epoxy resin in an amount of 8 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to be tacky and firm, yet bendable (flexible), indicating the pack possesses some consolidation, similar to the sand pack obtained in Example 3.

Example 5

Two hundred grams of 20/40-mesh Brady sand were first dry coated with 4 mL of tackifying compound (SAND-WEDGE® NT, commercially available from Halliburton Energy Services in Duncan, Okla.). The coated sand was then added to 250 mL of tap water and stirred well with an overhead stirrer to form a slurry. It was observed that the coated sand was quite tacky. A solvent-based epoxy resin EXPEDITE® 350A (commercially available from Halliburton Energy Services in Duncan, Okla.) in an amount of 0.2 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to be tacky and firm, yet bendable (flexible), indicating the pack possesses some consolidation.

Example 6

Two hundred grams of 20/40-mesh Brady sand were first dry coated with 4 mL of a tackifying compound (a dimer acid polyamide with additional amine functionality). The coated sand was then added to 250 mL of tap water and stirred well with an overhead stirrer to form a slurry. It was observed that the coated sand was quite tacky. A solvent-based epoxy resin EXPEDITE® 350A in an amount of 0.2 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to be tacky and firm, yet bendable (flexible), indicating the pack possesses some consolidation, similar to the sand pack obtained in Example 5.

Example 7

Two hundred grams of 20/40-mesh Brady sand were first dry coated with 3 mL of a tackifying compound (a dimer acid polyamide with additional amine functionality). The coated sand was then added to 250 mL of 3% KCl brine and stirred well with an overhead stirrer to form a slurry. It was observed that the coated sand was quite tacky. A solvent-based epoxy resin EXPEDITE® 350A in an amount of 0.2 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to be firm and still tacky with some consolidation. Consolidated cores were cut into size for unconfined compressive strength measurements. The sand pack was observed to be tacky. An average UCS of 6 psi was obtained.

Example 8

Two hundred grams of 20/40-mesh Brady sand were first dry coated with 3 mL of a tackifying compound (a dimer acid polyamide with additional amine functionality). The coated sand was then added to 250 mL of 3% KCl brine and stirred well with an overhead stirrer to form a slurry. It was observed that the coated sand was quite tacky. A solvent-based epoxy resin EXPEDITE® 350A in an amount of 0.2 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to be firm and still tacky with some consolidation. Consolidated cores were cut into size for unconfined compressive strength measurements. The sand pack was observed to be tacky. An average UCS of 70 psi was obtained.

Example 9

Two hundred grams of 20/40-mesh Brady sand were first dry coated with 3 mL of a tackifying compound (a dimer acid polyamide with additional amine functionality). The coated sand was then added to 250 mL of 30 lbs/Mgal linear borate fracturing fluid (SILVERSTIM$^{SM}$ LT) and stirred well with an overhead stirrer to form a slurry. It was observed that the coated sand was quite tacky. A solvent-based epoxy resin EXPEDITE® 350A in an amount of 0.2 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to be firm and still tacky with some consolidation. Consolidated cores were cut into size for unconfined compressive strength measurements. The sand pack was observed to be tacky. An average UCS of 3 psi was obtained.

Example 10

Two hundred grams of 20/40-mesh Brady sand were first dry coated with 3 mL of a tackifying compound (a dimer acid polyamide with additional amine functionality). The coated sand was then added to 250 mL of 30 lbs/Mgal linear borate fracturing fluid (SILVERSTIM$^{SM}$ LT) and stirred well with an overhead stirrer to form a slurry. It was observed that the coated sand was quite tacky. A solvent-based epoxy resin EXPEDITE® 350A in an amount of 0.2 mL was added to the slurry while it was being stirred. The slurry was decanted and packed into a brass cell. Both ends of the cell were capped to form a closed system before the cell was placed in an oven for curing at 200° F. for 20 hours. After the curing period, the sand pack was removed from the cell. The sand pack was observed to be firm and still tacky with some consolidation. Consolidated cores were cut into size for unconfined compressive strength measurements. The sand pack was observed to be tacky. An average UCS of 1 psi was obtained.

Example 11

In one experiment, a synthetic formation sand was prepared by mixing, by weight basis, 88% of 70/170-mesh sand, 10% of 325-mesh silica fines, and 2% smectite clay. This sane mixture in the amount of 200 grams was hand-mixed with 1 mL of 3% KCl brine to dampen the sand mixture minimizing segregation of fine particulates before packing into a flow cell. The flow cell has a dimension of 1⅜" ID and 5" in length. Wire mesh screens with 80-mesh were installed at the bottom and top of the sand pack. The sand pack was then saturated with 3% KCl brine and heated to 180° F. using heat tape and a thermocouple for 2 hours. This temperature was maintained during the fluid treatment of the sand pack. The treatment included a pre-flush using 3 pore volumes of 3% KCL brine at 10 mL/min flow rate, followed by an tacky-consolidate treatment fluid using 2 pore volumes of a mixture of an aqueous-based tackifying agent emulsion (1.6% w/w) and an aqueous-based epoxy emulsion (0.22% w/w), also at 10 mL/min flow rate. After the placement of the tacky-consolidate treatment fluid, the flow cell was shut-in and cured at 180° F. for 40 hours. After the curing period, the consolidated sand pack was removed from the flow cell, cut into cores for unconfined compressive strength (UCS) measurements. An average UCS value of 6 psi was obtained.

Example 12

This experiment was performed similarly to that of Example 11 as described above, except that a post-flush fluid was injected following the injection of the tacky-consolidate treatment fluid. The post-flush was 1 pore volume of kerosene injected at 10 mL/min. The treated sand pack was cured at 180° F. for 40 hours. An average UCS value of 5 psi was obtained.

Example 13

In this experiment, about 200 grams of 70/170-mesh sand was packed in the flow cell. The pack was then pre-flushed with a foam that had been prepared from 3 pore volumes of 3% KCl brine containing a 0.5% (v/v) foaming agent and 0.5% (v/v) cationic surfactant at an injection rate of 25 mL/min. After this injection, the sand pack was treated with a foam that had been prepared from 2 pore volumes of a mixture of an aqueous-based tackifying agent emulsion (3.2% w/w) and an aqueous-based epoxy emulsion (0.54% w/w), at 25 mL/min injection rate. The post-flush was 1 pore volume of diesel injected at 10 mL/min. After the post-flush, the treated sand pack was shut in and cured at 285° F. for 20 hours. An average UCS value of 5 psi was obtained.

Example 14

Example 14 was performed similarly to that of Example 13, except that 40/60-mesh sand was used in packing the flow cell. The treated sand pack was also shut in and cured at 285° F. for 20 hours. An average UCS value of 5 psi was obtained.

Example 15

Example 15 was performed similarly to that of Test 13, except that no post-flush fluid was injected into the sand pack after the injection of treatment fluid. The treated sand pack was shut in and cured at 285° F. for 20 hours. An average UCS value of 7 psi was obtained.

Example 16

In this experiment, about 200 grams of 70/170-mesh sand was packed in the flow cell. The pack was then pre-flushed with a foam that had been prepared from 3 pore volumes of 3% KCl brine containing a 0.5% (v/v) foaming agent and 0.5% (v/v) cationic surfactant at an injection rate of 25 mL/min. After this injection, the sand pack was treated with a foam that had been prepared from 2 pore volumes of a mixture of an aqueous-based tackifying agent emulsion (3.2% w/w) and an aqueous-based epoxy emulsion (3.0% w/w), at 25 mL/min injection rate. The post-flush was 1 pore volume of diesel injected at 10 mL/min. After the post-flush, the treated sand pack was shut in and cured at 285° F. for 20 hours. An average UCS value of 10 psi was obtained.

Example 17

Test 7 was performed similarly to that of Test 6, except that 40/60-mesh sand was used in packing the flow cell. The treated sand pack was also shut in and cured at 285° F. for 20 hours. An average UCS value of 7 psi was obtained.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   providing a portion of a subterranean formation comprising unconsolidated particulates;
   providing a tacky-consolidate treatment fluid comprising a tackifying compound, a curable resin, and a silane coupling agent,
      wherein the tacky-consolidate treatment fluid is an emulsion with a continuous phase comprising the silane coupling agent and a discontinuous phase comprising the tackifying compound and the curable resin; and
   placing the tacky-consolidate treatment fluid in the treated subterranean formation so as to form a tacky consolidate that comprises at least a portion of the unconsolidated particulates.

2. The method of claim 1 wherein the tackifying compound comprises a material chosen from the group consisting of: a non-aqueous tackifying agent, an aqueous tackifying agent, a silyl-modified polyamide, and a mixture thereof.

3. The method of claim 1 wherein the resin comprises a material chosen from the group consisting of: a two-component epoxy based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin, a hybrid of a polyester resin, a copolymer of a polyester resin, a polyurethane resin, a hybrid of a polyurethane resin, a copolymer of a polyurethane resin, an acrylate resin, a water-based resin, an HT epoxy-based resin, and a mixture thereof.

4. The method of claim 1 wherein the unconsolidated particulates are selected from the group consisting of formation fines, proppant, gravel, or combinations thereof.

5. The method of claim 1 wherein the tackifying compound is present in the tacky-consolidate treatment fluid in an amount from about 0.1% to about 10% (w/w).

6. The method of claim 1 wherein the resin is present in the tacky-consolidate treatment fluid in an amount from about 0.1% to about 10% (w/w).

7. The method of claim 1 wherein the silane coupling agent is present in the tacky-consolidate treatment fluid in an amount from about 0.01% to about 2% (w/w).

8. The method of claim 1 wherein the continuous phase comprises an aqueous-based fluid.

9. The method of claim 1 wherein the portion of the subterranean formation is located in the near well bore region.

10. The method of claim 1 wherein the portion of the subterranean formation neighbors a fracture face.

11. The method of claim 1 wherein at least a portion of the unconsolidated particulates are located within a fracture in the subterranean formation.

12. The method of claim 1 wherein the tacky-consolidate treatment fluid is placed in the subterranean formation, a gravel pack, or a proppant pack after a completion operation.

13. The method of claim 1 wherein the tacky-consolidate treatment system is placed in the subterranean formation after an acidizing treatment.

14. The method of claim 1 wherein the tacky-consolidate treatment system is placed in the subterranean formation before a completion operation.

15. The method of claim 1 wherein the tacky-consolidate treatment fluid comprises an additive chosen from the group consisting of a wetting agent, a scale inhibitor, and a corrosion inhibitor.

16. The method of claim 1 wherein the tacky-consolidate treatment fluid is created using a method selected from the group consisting of mixing on-the-fly and pre-mixing.

17. The method of claim 1 wherein the tacky-consolidate treatment fluid comprises a first emulsion comprising the curable resin and a second emulsion comprising the tackifying compound.

* * * * *